United States Patent
Adams et al.

(10) Patent No.: US 11,582,271 B2
(45) Date of Patent: *Feb. 14, 2023

(54) RESERVATION MANAGEMENT FOR POLLING REQUESTS IN A COMMUNICATION SYSTEM

(71) Applicant: Salesforce, Inc., San Francisco, CA (US)

(72) Inventors: Keith Adams, San Francisco, CA (US); Ryan Huber, Laura, IL (US); Mark Christian, Benicia, CA (US); James Scheinblum, Oakland, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/507,204

(22) Filed: Oct. 21, 2021

(65) Prior Publication Data

US 2022/0046070 A1 Feb. 10, 2022

Related U.S. Application Data

(63) Continuation of application No. 16/705,923, filed on Dec. 6, 2019, now Pat. No. 11,184,414.

(Continued)

(51) Int. Cl.
*H04L 67/62* (2022.01)
*H04L 65/401* (2022.01)
(Continued)

(52) U.S. Cl.
CPC .......... *H04L 65/401* (2022.05); *H04L 43/10* (2013.01); *H04L 65/80* (2013.01); *H04L 67/01* (2022.05);
(Continued)

(58) Field of Classification Search
CPC ............. H04L 65/4007; H04L 67/1095; H04L 67/325; H04L 43/10; H04L 67/146;
(Continued)

(56) References Cited

U.S. PATENT DOCUMENTS 6,353,926 B1 3/2002 Parthesarathy et al.
6,996,627 B1 2/2006 Carden
(Continued)

FOREIGN PATENT DOCUMENTS

CN 106850745 6/2017
CN 105337800 B * 2/2019 ........... H04L 43/103

OTHER PUBLICATIONS

David Auberbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.

(Continued)

*Primary Examiner* — Oanh Duong
(74) *Attorney, Agent, or Firm* — Lee & Hayes, P.C.

(57) ABSTRACT

Techniques for committing back end computing resources to an online stream of requests for data from client devices are described herein. A polling schedule server (e.g., a reservation management system), may receive polling reservation requests from a plurality of client devices, may evaluate each client device's need for "fresh" data based on a number of input signals, and may assign the client device a polling slot (e.g., a reservation for a future polling time). The polling scheduler server may subsequently receive a polling request from a client device and, upon validating a token received from the client device as well as a difference between an assigned polling time and the polling request timestamp, (Continued)

may grant the polling request by transmitting a request to one or more communication system servers, receiving data from the communication system servers, and providing the data to the client device.

20 Claims, 8 Drawing Sheets

Related U.S. Application Data

(60) Provisional application No. 62/776,921, filed on Dec. 7, 2018.

(51) Int. Cl.
  *H04L 67/1095* (2022.01)
  *H04L 43/10* (2022.01)
  *H04L 67/146* (2022.01)
  *H04L 67/02* (2022.01)
  *H04L 65/80* (2022.01)
  *H04L 67/01* (2022.01)
  *H04L 67/133* (2022.01)

(52) U.S. Cl.
  CPC .......... *H04L 67/02* (2013.01); *H04L 67/1095* (2013.01); *H04L 67/133* (2022.05); *H04L 67/146* (2013.01); *H04L 67/62* (2022.05)

(58) Field of Classification Search
  CPC ......... H04L 67/40; H04L 67/42; H04L 67/02; H04L 65/80; H04L 41/04; H04L 12/1822; H04L 51/08; H04L 51/18; H04L 67/22; H04L 67/26
  See application file for complete search history.

(56) References Cited

U.S. PATENT DOCUMENTS

| | | | |
|---|---|---|---|
| 7,130,885 B2 | 10/2006 | Chandra et al. | |
| 9,088,622 B2 | 7/2015 | Erbe | |
| 11,184,414 B2* | 11/2021 | Adams | H04L 67/133 |
| 2002/0042830 A1 | 4/2002 | Bose et al. | |
| 2003/0009385 A1 | 1/2003 | Tucciarone et al. | |
| 2003/0074253 A1 | 4/2003 | Scheuring et al. | |
| 2007/0078976 A1 | 4/2007 | Taylor et al. | |
| 2012/0131095 A1 | 5/2012 | Luna et al. | |
| 2012/0240062 A1 | 9/2012 | Passmore et al. | |
| 2013/0013676 A1 | 1/2013 | Blair et al. | |
| 2013/0041974 A1 | 2/2013 | Luna et al. | |
| 2013/0275525 A1 | 10/2013 | Molina et al. | |
| 2015/0188799 A1 | 7/2015 | Keskitalo et al. | |
| 2016/0323335 A1* | 11/2016 | Yeskel | H04L 51/10 |
| 2018/0287982 A1 | 10/2018 | Draeger et al. | |
| 2019/0012389 A1 | 1/2019 | Beggy et al. | |
| 2019/0173989 A1 | 6/2019 | Elmasri et al. | |
| 2020/0127927 A1* | 4/2020 | Miller | H04L 43/10 |
| 2020/0151809 A1 | 5/2020 | Lee | |
| 2020/0186579 A1 | 6/2020 | Adams et al. | |

OTHER PUBLICATIONS

Michael Carney, "Slack is thriving on a cocktail of whimsy and great timing", PANDODAILY, LEXISNEXIS, https://advance.lexis.com/api/permalink/dd2d4ee5-2ddf-4d3a-a1d9-3bcee5e38b74/?context=1000516, (dated Feb. 6, 2015, 2:12 AM) 4 pages.
"Die, Email, Die! A Flickr Cofounder Aims To Cut US All Some Slack", READWRITEWEB, LEXISNEXIS, https://advance.lexis.com/api/permalink/33dd79e2-90f5-409d-ae27-5a2c7e86bf31/?context=1000516>. (dated Aug. 14, 2013, 4:15 PM) 3 pages.
Robert Hof, "Stewart Butterfield On How Slack Became A $2.8 Billion Unicorn", FORBES, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.
"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.
Matthew Ingram, "Flickr co-founder launches Slack, an all-in-one messaging tool designed to kill email forever", GIGAOM, LEXISNEXIS, https://advance.lexis.com/api/permalink/0b676b7c-aec3-4560-861e-d030d1dd008c/?context=1000516, (dated Feb. 12, 2014, 7:03 PM), 3 pages.
Internet Relay Chat, WIKIPEDIA, [online][retrieved May 30, 2019], Retrieved from the Internet: <URL: https://en.wikipedia.org/wiki/Internet_Relay_Chat> (dated May 28, 2019) 21 pages.
Mike Issac, "Slack, a Start-Up With an App to Foster Business Collaboration, Is Valued at $1.1 Billion", The New York Times Blogs (BITS), LEXISNEXIS, https://advancelexis.com/api/permalink/3eb84b34-a8f9-4d7d-9573-89d9598a4963/?context=1000516>. (dated Oct. 31, 2014) 3 pages.
Adrienne LaFrance, "The Triumph of Email", ATLANTIC ONLINE, LEXISNEXIS, https://advance.lexis.com/api/permalink/32d7ddd9-d4c1-4a73-86f7-08ab5842fde6/?context=1000516, (dated Jan. 6, 2016) 6 pages.
Matsumoto, T. et al., "Chocoa Communicator—A New Communication System Based on Awareness and Text Communications", FUJITSU Sci. Tech. J., 36,2, (Dec. 2000) pp. 154-161.
Oikarinen, J. & Reed, D., "Internet Relay Chat Protocol", Request for Comments: 1459, NETWORK WORKING GROUP, [online][retrieved May 30, 2019]. Retrieved from the Internet: <URL: https://www.rfc-editor.org/rfc/rfc1459.txt>. (dated May 1993) 57 pages.
Ernie Smith, "Picking Up The Slack", TEDIUM, [online][retrieved May 9, 2019]. Retrieved from the Internet: <URL: https://tedium.co/2017/10/17/irc-vs-slack-chat-history/> (dated Oct. 17, 2017) 8 pages.
The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.
Jonathan Vanian, "Why these startups think chat apps are the next big thing in workplace collaboration", GIGAOM, LEXISNEXIS, https://advance.lexis.com/api/permalink/e83778c8-09c8-43aa-9ba0-88526283de69/?context=1000516, (dated Aug. 1, 2014, 5:45 PM) 4 pages.
Rebecca Walberg, "Email biggest office waste of time: survey", NATIONAL POST, At FP10, LEXISNEXIS, https://advance.lexis.com/api/permalink/96268e3f-26ad-48ac-a98f-6c39804ebded/?context=1000516, (dated Mar. 4, 2014) 3 pages.

* cited by examiner

RESERVATION MANAGEMENT FOR POLLING REQUESTS IN A COMMUNICATION SYSTEM

CROSS-REFERENCE TO RELATED APPLICATIONS

This application is a continuation of and claims priority to U.S. patent application Ser. No. 16/705,923, filed Dec. 6, 2019, and entitled "Reservation Management For Client-Initiated Polling Requests In A Communication System," which claims priority U.S. Provisional Application No. 62/776,921, entitled "RESERVATION MANAGEMENT FOR CLIENT-INITIATED POLLING REQUESTS IN A COMMUNICATION SYSTEM," filed Dec. 7, 2018, the contents of which are both incorporated herein by reference in their entirety.

BACKGROUND

Systems have been provided for interactions between client devices and servers over client-initiated pull based communications connections. Through applied effort, ingenuity, and innovation many deficiencies of such systems have been solved by developing solutions that are in accordance with the embodiments of the present invention, many examples of which are described in detail herein.

BRIEF SUMMARY

Client devices access a real-time messaging server for updated object data without accessing back end servers of a communication system. The client devices establish an RTM connection with the real-time messaging server, which is a server-push-based communication connection. In the event of an interruption in the RTM connection (e.g., an active websocket fails), the client device is still in need of updated object data. In such a situation, the client device may then access a web API via a non-RTM connection (e.g., a client pull based communication connection) to poll the back end for updated object data.

In a communication system involving several client devices, having each and every client device request to poll the back end for updated object data causes a significant, simultaneous, and unpredictable spike in load on the back end. Such a spike can lead to many processing drawbacks, including an increase in latency and the possibility of failures. An alternative, as determined by the inventors, is to provide for periodic and dynamically scheduled polling to ensure fresh data as well as a consistent and manageable load on the back end.

Various embodiments serve to provide a mechanism for committing back end computing resources to an online stream of requests for data from client devices. In certain embodiments, a client device transmits a polling reservation request (e.g., a reservation call), which may entitle the client device to one or more future service calls (e.g., polling requests). In certain embodiments, the client device transmits a polling request (e.g., a service call), which may provide the client device a portion of backend resources.

A polling schedule server (e.g., a reservation management system), receives polling reservation requests from a plurality of client devices, evaluates each client device's need for "fresh" data based on a number of input signals, and assigns the client device a polling slot (e.g., a reservation for a future polling time). The polling scheduler server subsequently receives a polling request from a client device and, upon validating a token received from the client device as well as a difference between an assigned polling time and the polling request timestamp, grants the polling request by transmitting a request to one or more communication system servers, receiving data from the communication system servers, and providing the data to the client device.

Various embodiments are directed to an apparatus for managing client initiated polling requests in a communication system. In embodiments, the communication system comprises one or more communication servers. In embodiments, the apparatus comprises at least one processor and at least one non-transitory storage medium for storing instructions that, when executed using the at least one processor, cause the apparatus to perform various functions.

In embodiments, the functions include receiving, from a client device accessing the communication system, a polling reservation request. In embodiments, the polling reservation request comprises a client device identifier, a user identifier, an object identifier, a staleness tolerance level, and a plurality of client device attention signals.

In embodiments, the functions include receiving, from one or more communication servers, a plurality of data mutation signals. In embodiments, each data mutation signal is associated with a data mutation rate and a communication system object identifier.

In embodiments, the functions include determining a first polling slot from a plurality of available polling slots, where the determining is based on the object identifier, the staleness tolerance level, the data mutation rates, and the plurality of client device attention signals.

In embodiments, the functions include transmitting, to the client device, a reservation grant message comprising the object identifier, a first polling time associated with the first polling slot, and a first polling token.

In embodiments, the functions include receiving, from the client device, a first polling request. In embodiments, the first polling request comprises the client device identifier, the object identifier, and the first polling token, where the first polling request is associated with a first polling request timestamp.

In embodiments, the functions include comparing the first polling request timestamp with the first polling time associated with the first polling slot. In embodiments, the functions include, upon determining that a difference between the first polling request timestamp and the first polling time meets an acceptable time gap threshold, validating the first polling token and retrieving the first polling slot based on the first polling token.

In embodiments, the functions include, upon determining that the first polling token is valid, transmitted a polling thread request to one or more communication servers based on the first polling request.

In embodiments, the functions include receiving a polling data grant from the one or more communication servers and transmitting the polling data grant to the client device.

In embodiments, the functions include receiving, from the client device, a second polling request comprising the client device identifier, the object identifier, and the first polling token, the second polling request associated with a timestamp.

In embodiments, the first polling token is validated.

In embodiments, the functions include receiving, from one or more communications servers, a plurality of updated data mutation rates.

In embodiments, the functions include determining a second polling slot from a plurality of available polling slots, the determining based on the plurality of updated data mutation rates.

In embodiments, the functions include transmitting, to the client device, a second reservation grant message comprising the object identifier, a second polling time associated with the second polling slot, and a second polling token.

In embodiments, the staleness tolerance level represents a level of importance of fresh data to the client device.

In embodiments, a client device attention signal represents electronic interactions on a client device with a communication system interface or other interfaces on the client device.

In embodiments, a client device attention signal is representative of one or more of: (1) is the communication system interface focused on the client device, and if not, how long has it been since it was focused; (2) is the communication system interface displayed on the client device, and if not, how long has it been since it was displayed; (3) how long has it been since the user interacted with the communication system interface in some way; (4) how long has it been since the user interacted with the client device in some way; (5) is a screensaver interface displayed on the client device; and (6) has the user recently received a push notification on the client device.

In embodiments, the data mutation signal is representative of electronic interaction activity associated with a communication system object identifier. In embodiments, the data mutation rate is determined based on a number of data mutation signals associated with a communication system object identifier received over a particular amount of network time.

In embodiments, the polling slot comprises a duration of network time during which a polling request will be granted for a particular device from which the polling request was received.

In embodiments, the object identifier comprises a group-based communication channel identifier.

In embodiments, the acceptable time gap threshold is a maximum duration of network time that can exist between the polling request timestamp and the polling time.

In embodiments, the polling request is a transmission of a request message to a web Application Programming Interface (API). In embodiments, the polling request message is a Hypertext Transfer Protocol (HTTP) request.

In embodiments, the reservation grant message comprises a plurality of polling times.

In embodiments, the communication system comprises a group-based communication system. In embodiments, the one or more communication servers comprise group-based communication servers.

BRIEF DESCRIPTION OF THE DRAWINGS

Reference will now be made to the accompanying drawings, which are not necessarily drawn to scale.

DETAILED DESCRIPTION

Figure 1:
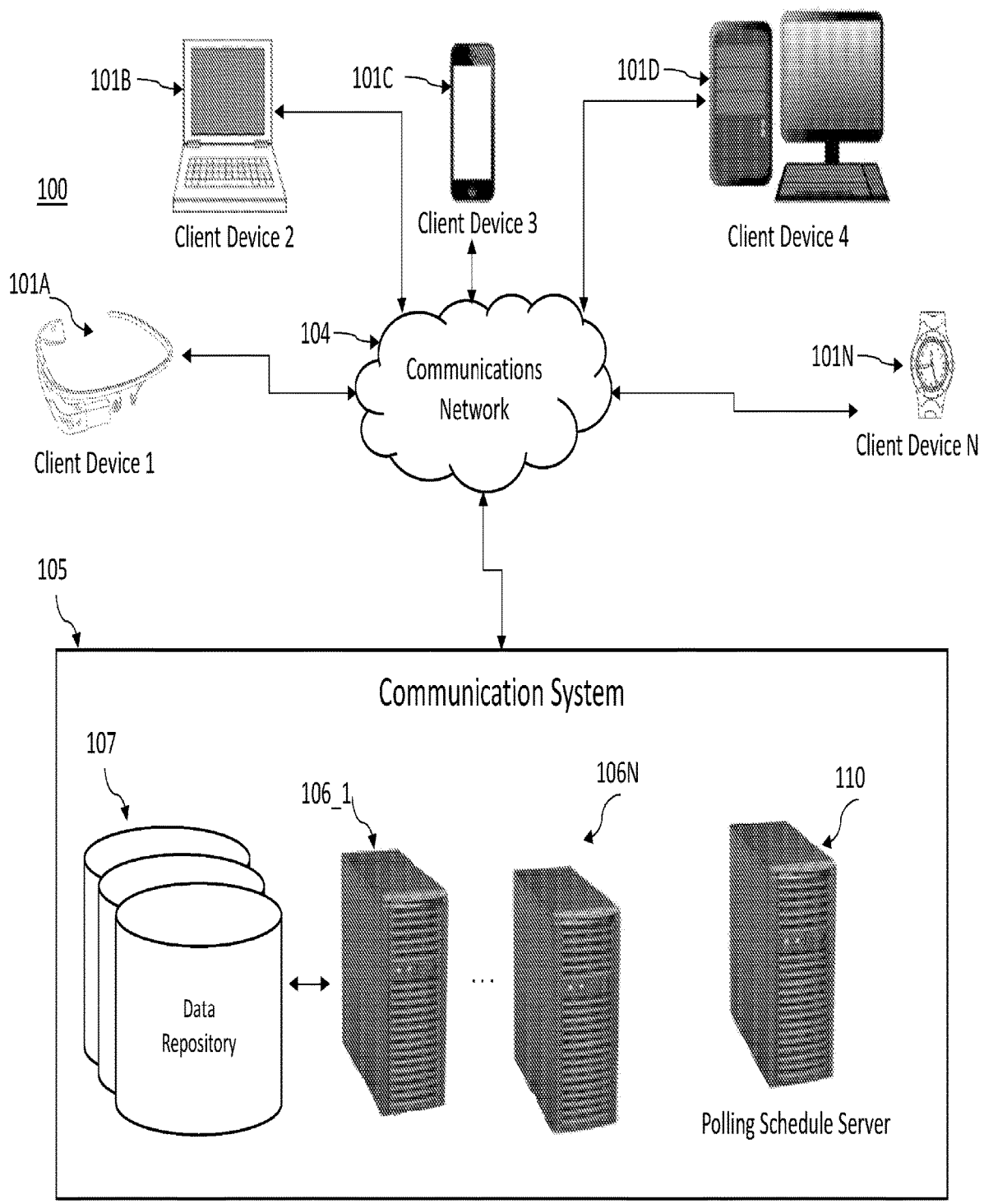
FIG. 1 shows a schematic view of a communication platform in communication with client devices according to embodiments of the present disclosure.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Overview

In a communication system, client devices receive data transmissions from communication servers and render communication interfaces based on the received data. Objects associated with the communication interfaces, and therefore the communication system, may be rapidly changing, quickly rendering any object data at the client device "stale" or "out of date." Accordingly, a communication system may rely upon a real-time messaging (RTM) communications connection to provide real-time updated object data to client devices based on objects for which each client device has requested updates.

In the event of an interruption in the RTM connection (e.g., an active websocket fails), the client device is still in need of updated object data. In such a situation, the client device may then access a web API via a non-RTM connection (e.g., a client pull based communication connection) to poll the back end for updated object data.

In a communication system involving several client devices, having every client device request to poll the back end for updated object data causes a significant and simultaneous spike in load on the back end. An alternative, as determined by the inventors, is to provide for periodic and dynamically scheduled polling to ensure fresh data as well as a consistent and manageable load on the back end.

Accordingly, the inventors have determined that a more distributed processing load can be achieved by managing future polling request reservations for client devices. This also results in continuity of functionality of communication interfaces at the client devices in the event of interruption of an RTM connection, and reduces network traffic during outages.

Definitions

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like. Similarly, where a computing device is described herein to send data to another computing device, it will be appreciated that the data may be sent directly to another computing device or may be sent indirectly via one or more intermediary computing devices, such as, for example, one or more servers, relays, proxies, routers, network access points, base stations, hosts, and/or the like.

The term "user" should be understood to refer to an individual, a group of individuals, business, organization, and the like. Users may access a communication or messaging system using client devices (e.g., a group-based communication system). "Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

The terms "user profile," "user account," and "user account details" refer to information associated with a user, including, for example, a user identifier, one or more communication channel identifiers (e.g., group-based communication channel identifiers) associated with communication channels (e.g., group-based communication channels) that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., jdoe), a password, a time zone, a status, and the like. The user account details can include a subset designation of user credentials, such as, for example, login information for the user including the user's username and password.

The term "client device" refers to computer hardware(s) and/or software(s) that is/are configured to access one or more services made available by one or more servers. The server(s) is/are often (but not always) on another computer system (e.g., a computing platform, such as a group-based communication platform), in which case the client device accesses the service by way of a network. A client device may be associated with a group identification, where the group identification is an electronic indication that suggests a group (e.g., user group) that the user belongs to. Client devices may include, without limitation, smart phones, tablet computers, laptop computers, desktop computers, wearable devices, personal computers, enterprise computers, and the like. A client device may be associated with a client device identifier or client identifier, which comprises one or more items of data by which a client device may be uniquely To access the services of a computing platform, the client device and/or computing platform establish a network connection (e.g., a "communication connection") therebetween embodied as an individual connection session. A single client device may utilize a plurality of connection sessions with a computing platform for data transfer over a period of time. As discussed herein, data relevant to a particular client device (e.g., updates for particular objects) may continue to be generated by (or provided to) the computing platform between connection sessions (while the client device is disconnected from the computing platform), and such data may be provided to the client device during a subsequent connection session.

In embodiments, a communication connection may be an active websocket connection (e.g., an "real-time messaging" (RTM) connection, a "push" or server initiated connection), a non-RTM connection (e.g., a "pull" or client initiated connection), and the like. A client device may communicate with an RTM server (e.g., a group-based communication server configured for real time messaging communications) over an active websocket connection. A client device may, in addition or alternatively, communicate with a non-RTM server (e.g., a communication server not configured for real time messaging communications, or a polling scheduler server) over a non-RTM connection (e.g., by utilizing an HTTP request message).

The terms "communication system" and "communication platform" refer to a communications software platform and associated hardware that is configured to support and maintain a plurality of communication interfaces and all associated functionality. Example communication systems comprise supporting servers, client devices, and external application servers.

The terms "group-based communication system" and "group-based communication platform" refer to a communications software platform and associated hardware that is configured to support and maintain a plurality of group-based communication interfaces and all associated functionality. Group-based communication system users are organized into organization groups (e.g., employees of different companies may be separate organization groups) and each group interacts with the system via a respective group-based communication interface. For example, the group-based communication system might support, among others, a Slack Corporation group-based communication interface and an ACME Corporation group-based communication interface. Example group-based communication systems comprise supporting servers, client devices, and external application servers.

The term "group-based communication channel" refers to a virtual communications environment or feed that is configured to display group-based messages posted by channel members (e.g., validated users accessing the environment using client devices) that are viewable only to the members of the group. The format of the group-based communication channel may appear differently to different members of the group-based communication channel; however, the content of the group-based communication channel (i.e., group-based messages) will be displayed to each member of the group-based communication channel. For instance, a common set of group-based messages will be displayed to each member of the respective group-based communication channel such that the content of the group-based communication channel interface (i.e., group-based messages) will not vary per member of the group-based communication channel. In embodiments, however, the content of the group-based communication channel interface may vary per member of the group-based communication channel based on varying permissions associated with each member (e.g., a first member may post a message to a channel along with a file; the message may be displayed to a second member but the file may not be accessible by the second member, in which case the display of the file may differ from the display of the file to the first member).

Multiple communication channels may operate on each of one or more computing devices, and therefore a communication channel identifier may be assigned to a communication channel, which indicates the physical address in a database where related data of that communication channel is stored and which is utilized to identify client devices that participate within the communication channel to receive data exchanged on the communication channel. The communication channel identifier therefore ensures communication channels remain distinct and separate even on computing devices associated with a plurality of communication channels.

A communication channel may be "public," which may allow any client device to join and participate in the information sharing through the communication channel. A communication channel may be "private," which may restrict data communications in the communication channel to certain client devices and/or users.

The term "group-based communication channel interface" refers to a virtual communications environment or feed that is configured to display messaging communications posted by channel members (e.g., validated users accessing the environment using client devices) that are viewable only to the members of the group. The format of the group-based communication channel interface may appear differently to different members of the group-based communication channel; however, the content of the group-based communication channel interface (i.e., messaging communications) will be displayed to each member of the group-based communication channel. For instance, a common set of group-based messaging communications will be displayed to each member of the respective group-based communication channel such that the content of the group-based communication channel interface (i.e., messaging communications) will not vary per member of the group-based communication channel.

In certain embodiments, the group-based communication interface may comprise multiple visible panes within a display window, for example. In certain embodiments, each display pane may be configured to display specific data types. For example, a left-most pane may provide a listing of channels and/or direct messages available to a user and a right-most (or center pane, in a 3-pane configuration) may display the content of a particular channel in which messages are exchanged, including displaying all of those displayed messages. The content of the center pane may be presented as a scrollable feed in certain embodiments. In embodiments in which the main display window comprises 3-panes, the right-most pane may comprise additional data regarding a particular selected message, channel, and/or the like.

As used herein, the terms "messaging communication" and "message" refer to any electronically generated digital content object provided by a user using a client device and that is configured for display within a group-based communication interface. Message communications may include any text, image, video, audio, or combination thereof provided by a user (using a client device). For instance, the user may provide a messaging communication that includes text as well as an image and a video within the messaging communication as message contents. In such a case, the text, image, and video would comprise the messaging communication or digital content object. Each message sent or posted to a communication channel (e.g., a group-based communication channel) of the group-based communication system includes metadata comprising the following: a sending user identifier, a message identifier, message contents, an object identifier, a group identifier and/or a group-based communication channel identifier. Each of the foregoing identifiers may comprise ASCII text, a pointer, a memory address, and the like. Messages may be generated and/or edited within an individual pane of a group-based communication interface (a single pane being visible within a particular display window) and/or messages may be generated and/or edited within separate display windows (e.g., separate display windows may be utilized for generating postings to be shared within a communication channel and/or for initiating a call with other users).

The term "object" as used herein may refer to any content source for which updates may be provided and disseminated to one or more client devices. A particular user may be considered an object to other users, such that updates regarding the characteristics and/or activities of the particular user may be disseminated to other client devices. Objects may also be embodied as files in certain embodiments, such that updates to those files may be disseminated to individual client devices. Objects may also be embodied as channels in certain embodiments, such that updates to those channels may be disseminated to individual client devices. Updates relating to particular objects may be disseminated from the group-based communication platform to individual client devices as messages, which may comprise additional metadata identifying a particular object (referred to herein as an object identifier) to which the updates relate. These object identifiers enable a client device to display the update in association with the appropriate object and/or store the update in association with the appropriate object within a local data store on the client device. In certain embodiments, the object identifiers comprise data indicative of the type of object to which the object relates (e.g., a user object, a file object, and/or the like) and may additionally or alternatively comprise data indicative of a unique string (e.g., a unique number, a unique alphanumeric string, and/or the like) that uniquely identifies the object (e.g., among all of objects or among all objects of a particular object type). In embodiments, a group-based communication interface object is associated with an object such that a group-based communication interface is a rendering in a graphical user interface (GUI) of a representation of the object.

Object updates (or "updated object data") may be provided to client devices. Objects stored locally within a local data store on the client device (e.g., locally stored copies of objects reflected on the computing platform) are updated by replacing and/or supplementing data stored within the local data store of the client device with new data reflective of the object updates received from a computing platform, such as the group-based communication platform. For example, updated object data may be representative of events associated with group-based communication interface objects (e.g., channels) to which the client device has subscribed (e.g., a websocket event subscription).

The locally stored objects within the data store may be utilized by one or more applications, computer programs, or other local processing instances executing on the client device. These local processing instances may comprise one or more graphical user interfaces for displaying objects, one or more executable programs configured for intaking objects as input, and/or the like. The locally stored objects may be retrieved from the local data store via a "get" process in which the objects are retrieved from the local data store and passed to one or more local processing instances. In examples, the locally stored objects are utilized in generating, for display, a group-based communications interface on a client device.

The terms "group identifier" or "team identifier" refer to one or more items of data by which a group within a group-based communication system may be identified. For example, a group identifier may comprise ASCII text, a pointer, a memory address, and the like.

The terms "group-based communication channel identifier" or "channel identifier" refer to one or more items of data by which a group-based communication channel may be identified. For example, a group-based communication channel identifier may comprise ASCII text, a pointer, a memory address, and the like. In certain embodiments, a communication channel (whether public or private) may be available for use between users (and their associated client devices) of a common group/team, although cross-group communication channels may be available between client devices associated with users of separate teams. Thus, a channel identifier may be provided together with one or more group identifiers to specifically identify where data/messages related to the particular communication channel are stored.

The term "communication interface" refers to a virtual communications environment configured to facilitate user interaction with a communications system.

The term "group-based communication interface" refers to a virtual communications environment configured to facilitate user interaction with a group-based communications system. Each group-based communication interface is accessible and viewable to a selected group of users, such as a group of employees of a business or organization (e.g., the Slack Corp. interface would be accessible and viewable to the Slack employees however the ACME Corporation group-based communication interface might not be accessible and viewable to Slack employees unless the interface is designated as shared). The group-based communication interface includes a plurality of group-based communication channels (e.g., a marketing channel, sales channel, accounting channel, etc.), which are defined below.

A "sending user identifier" is associated with a collection of messages that are sent by a particular user (i.e., a client device associated with the particular user). These messages may be analyzed to determine context regarding the user (e.g., the user's expertise or interest in a topic may be determined based on the frequency of mention of the topic or key words associated with the topic within such messages).

Group-based communication system users are organized into organization groups (e.g., employees of each company may be a separate organization group) and each organization group may have one or more communication channels (e.g., group-based communication channels) to which users may be assigned or which the users may join (e.g., group-based communication channels may represent departments, geographic locations such as offices, product lines, user interests, topics, issues, and/or the like). A group identifier may be used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

Group-based communication system users may join and/or create communication channels (e.g., group-based communication channels). Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier). A group-based communication channel may have a name associated therewith (a group-based communication channel name) that may be displayed in a group-based communication interface such that a user having a client device may interact with the interface in order to select the displayed name.

The term "private group-based communication channel" refers to a group-based communication channel with restricted access such that it is not generally accessible and/or searchable by other members of the group-based communication system. For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel.

"Communication servers" as discussed herein with reference to certain embodiments are computing devices configured for interacting with various client devices (e.g., via an interface computing entity) for receiving and/or disseminating object updates and/or other messages among client devices. Communication servers may be configured to receive, generate, store (in an associated database), and/or direct messages received from and/or disseminated to users (e.g., via corresponding client devices). The functionality of the communication servers may be provided via a single server or collection of servers having a common functionality, or the functionality of the communication servers may be segmented among a plurality of servers or collections of servers performing subsets of the described functionality of the communication servers.

"Group-based communication servers" or "remote servers" as discussed herein with reference to certain embodiments are computing devices configured for interacting with various client devices (e.g., via an interface computing entity) for receiving and/or disseminating object updates and/or other messages among client devices. Group-based communication servers may be configured to receive, generate, store (in an associated database), and/or direct messages received from and/or disseminated to users (e.g., via corresponding client devices). The functionality of the group-based communication servers may be provided via a single server or collection of servers having a common functionality, or the functionality of the group-based communication servers may be segmented among a plurality of servers or collections of servers performing subsets of the described functionality of the group-based communication servers.

The communication servers, group-based communication servers, or remote servers may be configured to maintain connection sessions with various client devices. Specifically, one or more servers may be configured for maintaining websocket connections (e.g., active websocket connections) initiated by each of a plurality of client devices for transmitting messages (e.g., object updates) and corresponding metadata (e.g., comprising object identifiers) in real time between group-based communication servers of the group-based communication platform and respective client devices.

The term "server-push-based communications connection" refers to a network connection over which a request for transmission of information is initiated by a server or publisher. In embodiments, a "server-push-based communications connection" may be based on information preferences expressed in advance by the client device to the server. In embodiments, a server-push-based communications connection may also be based on information associated with a user identifier associated with the client device. In embodiments, a client device subscribes to events associated with particular object identifiers such that whenever updated object data is available for the particular object identifier (i.e., an event has occurred), the server pushes the updated object data to the client device.

The term "client-pull-based communications connection" refers to a network connection over which a request for transmission of information is initiated by a client device or requester and responded to by a server or publisher.

The term "real-time" is used to describe a computing application that responds as rapidly as required by a user accessing the computing application. For example, real-time messaging may comprise group-based communication interfaces that provide a real-time or live transmission of messages from a sending client device to a receiving client device. It will be appreciated that "real-time" may be considered "without undue delay," or "as instantaneously as possible" within computing constraints.

The term "user interaction input" refers to input received by a client device as a result of user interaction with input devices communicably coupled to the client device. For example, user interaction input may comprise mouse-clicks and/or touch screen selections.

The term "electronic interactions" refers to electronic representations of user interaction inputs. For example, a user interaction in the form of a mouse-click may be represented by a timestamp, an object identifier, and an interaction type (e.g., selection/click).

The term "interruption" refers to a failure of a network/communication connection.

The terms "client initiated polling request" and "polling request" refer to a message transmitted from a client device to a polling schedule server that is intended eventually for a communication server, the request being for retrieval of data by the client device from the communication server. In examples, a polling request comprises an object identifier, a client device identifier, polling token and a polling request timestamp. It will be appreciated that a client initiated polling request or a polling request may also be intended eventually for a group-based communication server, according to embodiments.

The term "timestamp" refers to a digital representation of an instance in network time associated with a particular occurrence, such as a polling request or message transmission. For example, a timestamp can be the following: "<timestamp>2020-12-31 23:59:59</timestamp>". In embodiments, a timestamp is in relation to a wall clock (e.g., 2020-12-31).

The term "polling request timestamp" refers to a timestamp associated with when a particular polling request was transmitted by a client device or received by a poling schedule server.

The term "record" refers to a data structure containing object data associated with a particular object identifier. In embodiments, the object data is associated with a timestamp. In embodiments, the record is associated with a timestamp.

The term "mouse-click" refers to an input received by a client device from a hand-held pointing device communicably coupled thereto. In embodiments, a mouse-click indicates an electronic selection of one of a plurality of displayed objects in a communication interface (e.g., a group-based communication interface or other communication interface). In embodiments, a mouse-click is associated with one or more object identifiers.

The term "touch screen selection" refers to an input received by a client device from an input device (e.g., screen) layered on top of an electronic visual display of the client device. In embodiments, a touch screen selection indicates a "touch" of the screen where an object of the communication interface (e.g., a group-based communication interface or other communication interface) is displayed. In embodiments, a touch screen selection is associated with one or more object identifiers.

The term "web API" refers to a set of defined interfaces through which interactions occur between a communication platform and client or other devices accessing the communication platform (e.g., a group-based communication platform or other communication platform). In examples, a web API is a set of specifications, such as Hypertext Transfer Protocol (HTTP) request messages, and a set of response messages in, for example, JavaScript Object Notation (JSON) format.

The term "HTTP request" refers to an HTTP message transmitted from a client device to a communication server (e.g., group-based communication server or other communication server), the request being for retrieval of data by the client device from the communication server. In embodiments, the HTTP request may be a GET or POST request.

The term "polling reservation request" refers to an electronic request transmitted by a client device to a polling schedule server, the request for reserving a polling slot that allows the client device to transmit a polling request in order to receive data from one or more communication servers (e.g., group-based communication servers or other communication servers) based on a client device initiated communication connection. In examples, a polling reservation request comprises a client device identifier, a user identifier, an object identifier, a staleness tolerance level, and a plurality of client device attention signals.

The term "staleness tolerance level" refers to a required level of freshness of data for a particular client device. Accordingly, the client device may tolerate a particular level of staleness of data. In embodiments, staleness of data is represented by a difference in a timestamp associated with the data and a current timestamp. Accordingly, a client device may only require up to date object data every 30 seconds while another client device may require up to date object data every 2 seconds. These two client devices have varying staleness tolerance levels. It will be appreciated that the staleness or freshness of data may be represented in various ways without departing from the scope of the present disclosure.

The term "client device attention signal" refers to a signal indicative of electronic interactions on a client device with a communication system object (e.g., group-based communication system object or other communication system object). For example, a client device having a high number of electronic interactions currently may be considered highly attentive, while a client device that is seemingly idle within a communication interface (e.g., group-based communication interface or other communication system interface) may be considered not so attentive. Non-limiting examples of client device attention signals include: (1) is the communication interface focused on the client device, and if not, how long has it been since it was focused; (2) is the communication interface displayed on the client device, and if not, how long has it been since it was displayed; (3) how long has it been since the user interacted with the communication interface in some way; (4) how long has it been since the user interacted with the client device in some way; (5) is a screensaver interface displayed on the client device; (6) has the user recently received a push notification on the client device. Such metrics are utilized in determining polling slot selection. For example, such metrics aid in judgements made by the polling schedule server as to how important fresh data is to the client device. For example, the less visible the communication interface is, or the less the user interacts with the communication interface, the less important fresh data is to the client device.

The term "client device attention signals" refers to a set comprising a plurality of client device attention signals. In embodiments, this may be referred to as a client device attention signals set.

The term "data mutation signal" refers to an electronic signal representative of electronic interaction activity associated with a communication system object. For example, a data mutation signal may result from new messages being transmitted intended for the communication system from client devices.

The term "data mutation rate" refers to a rate at which a communication system object is being modified. For example, a data mutation rate may be determined based on a number of data mutation signals received over a particular amount of network time.

The terms "group-based communication channel modification signal" and "channel modification signal" refer to an electronic signal representative of electronic interaction activity associated with a group-based communication channel. For example, a channel modification signal may result from new messages being transmitted intended for the channel from client devices.

The terms "group-based communication channel modification rate" and "channel modification rate" refer to a rate at which a group-based communication channel is being modified. For example, a channel modification rate may be determined based on a number of group-based communication channel modification signals received over a particular amount of network time.

The term "polling slot" refers to a duration of network time during which a polling request (e.g., for updated object data from a communication server or group-based communication server) will be granted for a particular device from which the polling request was received. A polling slot may be determined by a polling schedule server based upon several factors, including a staleness tolerance level indicated by the client device (e.g., how long the client device can wait for updated object data), data mutation rates (e.g., how much activity is present with respect to any objects or given group-based communication channel and whether or not the client device is actively seeking updated object data associated with an active object or group-based communication channel), and the updated object data the client device is seeking.

The term "reservation grant message" refers to one or more items of data transmitted from a polling schedule server to a client device in response to the polling schedule server having received a polling reservation request from the client device. A reservation grant message provides to the client device a polling time associated with a polling slot for which the client device is approved, as well as a polling token for use in a subsequent polling request. In embodiments, the reservation grant message further comprises a plurality of polling slots for which the client device is approved (e.g., the polling schedule server may provide 17 slots available for the client device, with information indicating that if the client device misses a particular number of the slots, all will be revoked). In embodiments, a reservation grant message further comprises an indication of expiration of the reservation grant message.

The term "polling token" refers to one or more items of data for use in gaining access to an electronically restricted resource. In examples, the polling token is used to gain access to data controlled by a communication server and is used as a form of credential. A polling schedule server provides a polling token to a client device, and validates a received polling token from a client device before granting a polling request associated with the polling token.

The term "acceptable time gap threshold" refers to a maximum duration of network time that can exist between a polling request timestamp and a polling time associated with a polling token associated with the polling request. For example, an acceptable time gap threshold may be 3 ms, in which case if a polling request timestamp occurs less than 3 ms before or after a designated polling time, the acceptable time gap threshold has been met. If a polling request timestamp occurs more than 3 ms before or after the designated polling time, the acceptable time gap threshold has not been met and the polling request may not be granted.

The terms "polling thread request" or "thread execution request" refer to an electronic request transmitted from a polling schedule server to one or more group-based communication servers for an execution thread with which a polling request may be executed. For example, a polling thread request may be a request for an HHVM thread reservation. The polling thread request may also comprise one or more object identifiers for which data is requested.

The term "polling data grant" refers to one or more items of data returned from one or more communication servers in response to a polling thread request and/or a polling request. For example, the polling data grant may comprise updated object data for one or more objects identified in a polling thread request. The polling data grant may be returned to a polling schedule server or to a client device or both.

The term "error message" refers to an electronic signal or set of signals indicative of a failed request. For example, a polling schedule server may transmit an error message to a client device in response to a polling request received from the client device if a polling token in the polling request was not valid and/or if the polling request was received at a time that is inconsistent with or out of a boundary of a polling time reserved for the polling request. Alternatively, a polling schedule server may simply ignore the failed polling request and do nothing.

Example System Architecture

Methods, apparatuses, and computer program products of the present invention may be embodied by any of a variety of devices. For example, the method, apparatus, and computer program product of an example embodiment may be embodied by a network device, such as a server or other network entity, configured to communicate with one or more devices, such as one or more client devices. In some preferred and non-limiting embodiments, the computing device may include fixed computing devices, such as a personal computer or a computer workstation. Still further, example embodiments may be embodied by any of a variety of mobile devices, such as a portable digital assistant (PDA), mobile phone, smartphone, laptop computer, tablet computer, wearable device, or any combination of the aforementioned devices.

FIG. 1 illustrates example computing systems within which embodiments of the present invention may operate. Users may access a communication platform 105 via a communication network 104 using client devices 101A-101N. Communication platform 105 may, in some embodiments, comprise a group-based communication platform.

Communication network 104 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communication network 104 may include a cellular telephone, an 802.11, 802.16, 802.20, and/or WiMax network. Further, the communication network 104 may include a public network, such as the Internet, a private network, such as an intranet, or combinations thereof, and may utilize a variety of networking protocols now available or later developed including, but not limited to TCP/IP based networking protocols. As discussed herein, the networking protocol is configured to enable data transmission via websocket communications. For instance, the networking protocol may be customized to suit the needs of the group-based communication system. In some embodiments, the protocol is a custom protocol of JSON objects sent via a websocket channel. In some embodiments, data may be transmitted via a plurality of protocols, such as JSON over RPC, JSON over REST/HTTP, and the like.

In the illustrated embodiment, the group-based communication platform 105 includes a plurality of communication repositories 107, a plurality of communication servers 106_1-106N, and a polling schedule server 110 accessible via the communication network 103. Collectively, the communication servers 106_1-106N are configured for receiving messages transmitted from one or more client devices 101A-101N, generating and/or receiving messages indicative of object updates (if applicable), for transmitting messages to appropriate client devices 101A-101N.

In embodiments, the polling schedule server 110 interacts, via one or more communications networks 104, with the plurality of client devices 101A-101N as well as the communication system 105 in order to facilitate management of client-initiated polling requests intended for one or more communication servers 106_1-106N. In certain embodiments, the polling schedule server 110 facilitates transmissions of data to the client devices 101A-101N over non-RTM connections.

The client devices 101A-101N may be any computing device as defined above. Electronic message data exchanged between the communication servers 106_1-106N and the client devices 101A-101N may be provided in various forms and via various methods.

In some preferred and non-limiting embodiments, one or more of the client devices 101A-101N are mobile devices, such as smartphones or tablets. The one or more client devices may execute an "app" or other executable local processing instance to interact with the communication servers 106_1-106N. Such apps are typically designed to execute on mobile devices, such as smartphones or tablets. For example, an app may be provided that executes on mobile device operating systems such as Apple Inc.'s iOS®, Google Inc.'s Android®, or Microsoft Inc.'s Windows 10 Mobile®. These platforms typically provide frameworks that allow apps to communicate with one another, and with particular hardware and software components of mobile devices. For example, the mobile operating systems named above each provides frameworks for interacting with location services circuitry, wired and wireless network interfaces, user contacts, and other applications. Communication with hardware and software modules executing outside of the app is typically provided via application programming interfaces (APIs) provided by the mobile device operating system. Thus, via the app executing on the client devices 101A-101N, these client devices 101A-101N are configured for communicating with the communication platform 105 via one or more websockets or other communication connection.

In some preferred and non-limiting embodiments, the client devices 101A-101N may interact with the communication servers 106_1-106N via a web browser. The client devices 101A-101N may also include various hardware or firmware designed to interact with the communication servers 106_1-106N. Again, via the browser of the client devices 101A-101N, the client devices 101A-101N are configured for communicating with the communication platform 105 via one or more websockets or other communication connection.

In some embodiments of an exemplary communication platform 105, a message or messaging communication may be sent from a client device 101A-101N to a communication platform 105. In various implementations, messages may be sent to the communication platform 105 over communication network 104 directly by one of the client devices 101A-101N. The messages may be sent to the communication platform 105 via an intermediary such as a message server, and/or the like. For example, a client device 101A-101N may be a desktop, a laptop, a tablet, a smartphone, and/or the like that is executing a client application (e.g., a group-based communication app). In one implementation, the message may include data such as a message identifier, sending user identifier, a group identifier, a group-based communication channel identifier, message contents (e.g., text, emojis, images, links), attachments (e.g., files), message hierarchy data (e.g., the message may be a reply to another message), third party metadata, and/or the like. In one embodiment, the client device 101A-101N may provide the following example message, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>ID_user_1</user_name>
            <password>abc123</password>
            //OPTIONAL <cookie>cookieID</cookie>
            //OPTIONAL    <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
        //it should be noted that although several client details
        //sections are provided to show example variants of client
        //sources, further messages will include only on to save
        //space
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>MSM.app</app_name>
        <app_version>1.0 </app_version>
        <app_webkit_name>Mobile Safari</client_webkit _name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile_ Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus S
B uild/IMM76D) AppleWebKit/534.30 (KHTML, like Gecko) Version/4.0 Mobile
Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-
XXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-
XXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
```

```
    </client_details>
    <message>
        <message_identifier>ID_message_10</message_identifier>
        <team_identifier>ID team_1</team_identifier>
        <channel_identifier>ID channel_1</channel_identifier>
        <contents>That is an interesting invention. I have attached a copy our patent
policy.</contents>
        <attachments>patent_policy.pdf</attachments>
    </message>
</auth_request>
```

In the illustrated embodiment, the communication platform 105 comprises a plurality of communication servers 106_1-106N configured to receive and/or disseminate messages transmitted between and/or to a plurality of client devices 101A-101N within a channel identified by a channel identifier and/or a group identifier, and to facilitate dissemination of those messages among client devices 101A-101N that collectively form the membership of the communication channel.

In some embodiments, an object identifier as defined above may be associated with the message to indicate that a particular message is embodied as an object update relating to a particular object.

In some embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel interface in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PUP commands) to determine the responses. In another implementation, data regarding responses to the message may be retrieved from a database. For example, data regarding responses to the message may be retrieved via a MySQL database command similar to the following:
SELECT messageResponses
FROM MSM_Message
WHERE messageID=ID_message_10.

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In embodiments, attachments may be included with the message. If there are attachments, files may be associated with the message, and these files may be separately identified as objects having a corresponding object identifier in certain embodiments. In one implementation, the message may be parsed (e.g., using PUP commands) to determine file names of the attachments. For example, file contents may be analyzed to determine context for the message (e.g., a patent policy document may indicate that the message is associated with the topic "patents").

In embodiments, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the channel) and/or proximity (e.g., message send order proximity, message send time proximity) of these messages.

In embodiments, various metadata, determined as described above, and/or the contents of the message may be used to index the message (e.g., using the conversation primitive) and/or to facilitate various facets of searching (i.e., search queries that return results from the group-based communication servers 106_1-106N). Metadata associated with the message may be determined and the message may be indexed in the group-based communication servers 106_1-106N. In one embodiment, the message may be indexed such that a company's or a group's messages are indexed separately (e.g., in a separate index associated with the group and/or company that is not shared with other groups and/or companies). In one implementation, messages may be indexed at a separate distributed repository (e.g., to facilitate data isolation for security purposes). If there are attachments associated with the message, file contents of the associated files may be used to index such files in the group-based communication servers 106_1-106N to facilitate searching. In one embodiment, the files may be indexed such that a company's or a group's files are indexed at a separate distributed repository.

Examples of electronic information exchange among one or more client devices 101A-101N and the communication platform 105 (e.g., a group-based communication system or other communication system) are described below with reference to FIG. 1.

As shown in FIG. 1, the communication platform 105 enables individual client devices 101A-101N to exchange various messages with one another and/or to retrieve object updates disseminated from the communication platform 105. To exchange such messages, individual client devices 101A-101N transmit messages (e.g., text-based messages, files, video and/or audio streams, and/or the like) via a communication protocol (e.g., via a websocket, a non-RTM (non-Real Time Messaging) messaging protocol, and/or the like). Those messages are ultimately provided to one or more communication servers 106_1-106N, which indexes the messages and distributes those messages to the intended recipients (e.g., client devices 101A-101N) of the message. Object updates are similarly provided to the communication servers 106_1-106N, however such object updates may not originate from client devices 101A-101N. Instead, object updates may be provided from one or more external systems (e.g., file management systems) or the object updates may be generated by one or more computing entities within the communication platform 105. The distributed messages are provided to the recipient client devices 101A-101N via the communication servers 106_1-106N, which maintain websocket connections with individual recipient client devices 101A-101N of the message.

According to the embodiment of FIG. 1, the client devices 101A-101N are configured to display the received message in contextually-relevant user interfaces available to the user of the client device 101A-101N. For example, messages transmitted from a first client device 101 as a part of a group-based communication channel are displayed in a user interface display window on client devices 101A-101N associated with other members of the group-based communication channel. As discussed herein, messages indicative of particular object updates are transmitted with object identifiers usable by the recipient client devices 101A-101N to display those messages with appropriate context, such as appropriate user display elements and/or in association with applicable objects. Moreover, the object identifiers may be usable by various ones of the communication servers 106_1-106N to filter messages destined for particular client devices 101A-101N based on object subscriptions as discussed herein.

To distribute messages to individual client devices 101A-101N, the messages are transmitted from the communication servers 106_1-106N, which direct all messages destined for respective ones of the client devices 101A-101N, and transmits all of those messages to the client devices 101A-101N over appropriate connections (e.g., websocket connections, or non-RTM connections).

Example Apparatuses Utilized With Various Embodiments

Figure 2A:
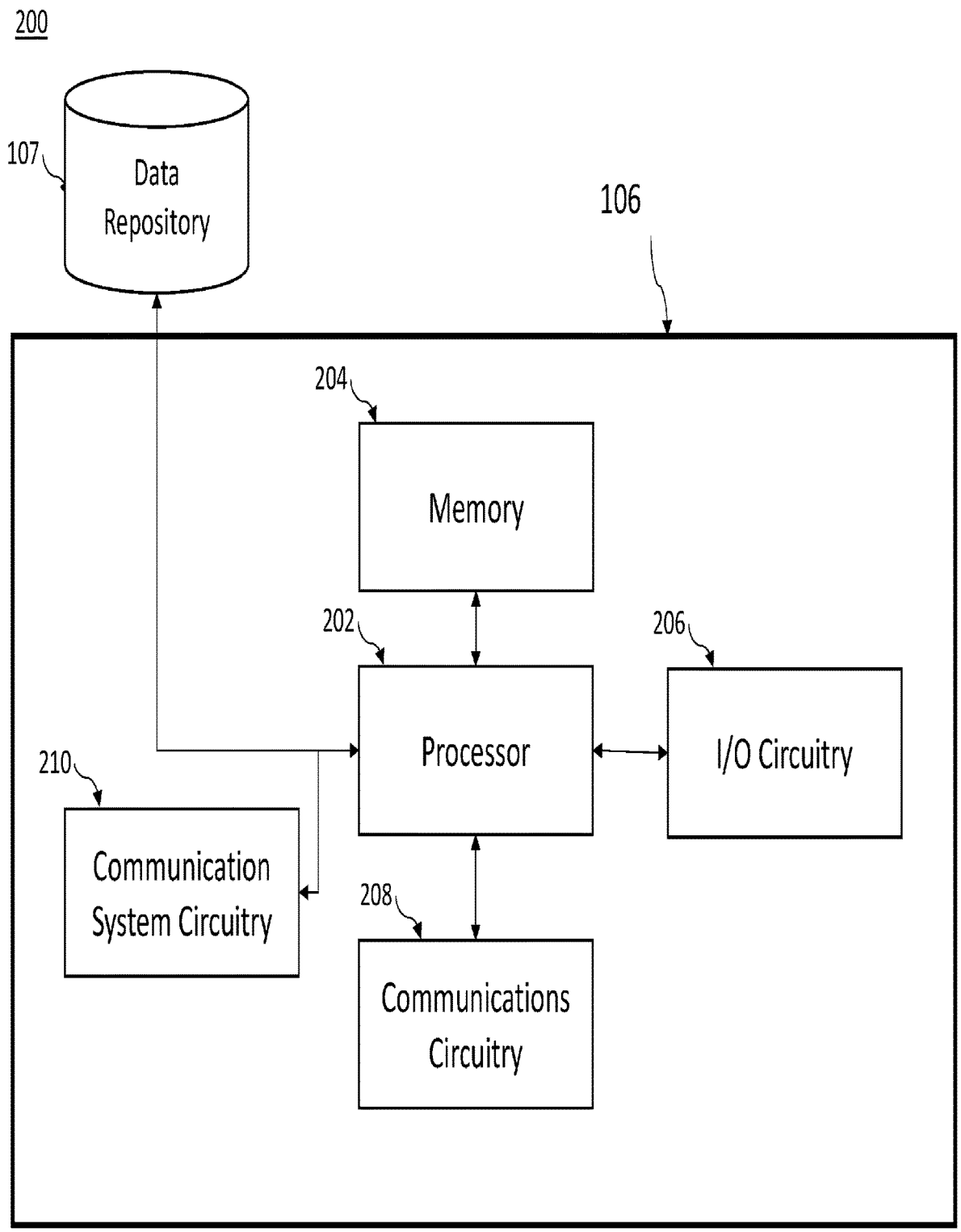
FIG. 2A shows a schematic view of an apparatus for use with embodiments of the present disclosure.

Each communication server 106 may be embodied by one or more computing systems, such as apparatus 200 shown in FIG. 2A. The apparatus 200 may include processor 202, memory 204, input/output circuitry 206, communications circuitry 208, and communication system circuitry 210. The apparatus 200 may be configured to execute the operations described herein. Although these components 202-210 are described with respect to functional limitations, it should be understood that the particular implementations necessarily include the use of particular hardware. It should also be understood that certain of these components 202-210 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present invention.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

As just one example, the processor 202 may be configured to maintain one or more communication channels connecting a plurality of client devices 101A-101N to enable message sharing/dissemination therebetween. The processor 202 ensures that messages intended for exchange between the client devices 101A-101N within the particular communication channel are properly disseminated to those client devices 101A-101N for display within respective display windows provided via the client devices 101A-101N.

Moreover, the processor 202 may be configured to synchronize messages exchanged on a particular communication channel with a database for storage and/or indexing of messages therein. In certain embodiments, the processor 202 may provide stored and/or indexed messages to the interface computing entity 109 for dissemination to client devices 101A-101N.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display, and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communications circuitry 208 may include the circuitry for interacting with the antenna/antennae to cause transmission of signals via the antenna/antennae or to handle receipt of signals received via the antenna/antennae.

Communication system circuitry 210 includes hardware configured to receive and distribute electronic messages and associated metadata received from one or more client devices 101A-101N to other client devices 101A-101N based on database shard(s). The communication system circuitry 210 may utilize processing circuitry, such as the processor 202, to perform these actions. However, it should also be appreciated that, in some embodiments, the communication system circuitry 210 may include a separate processor, specially configured Field Programmable Gate Array (FPGA), or Application Specific Integrated Circuit (ASIC) for performing the functions described herein. The communication system circuitry 210 may be implemented using hardware components of the apparatus configured by either hardware or software for implementing these planned functions.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

Figure 2B:
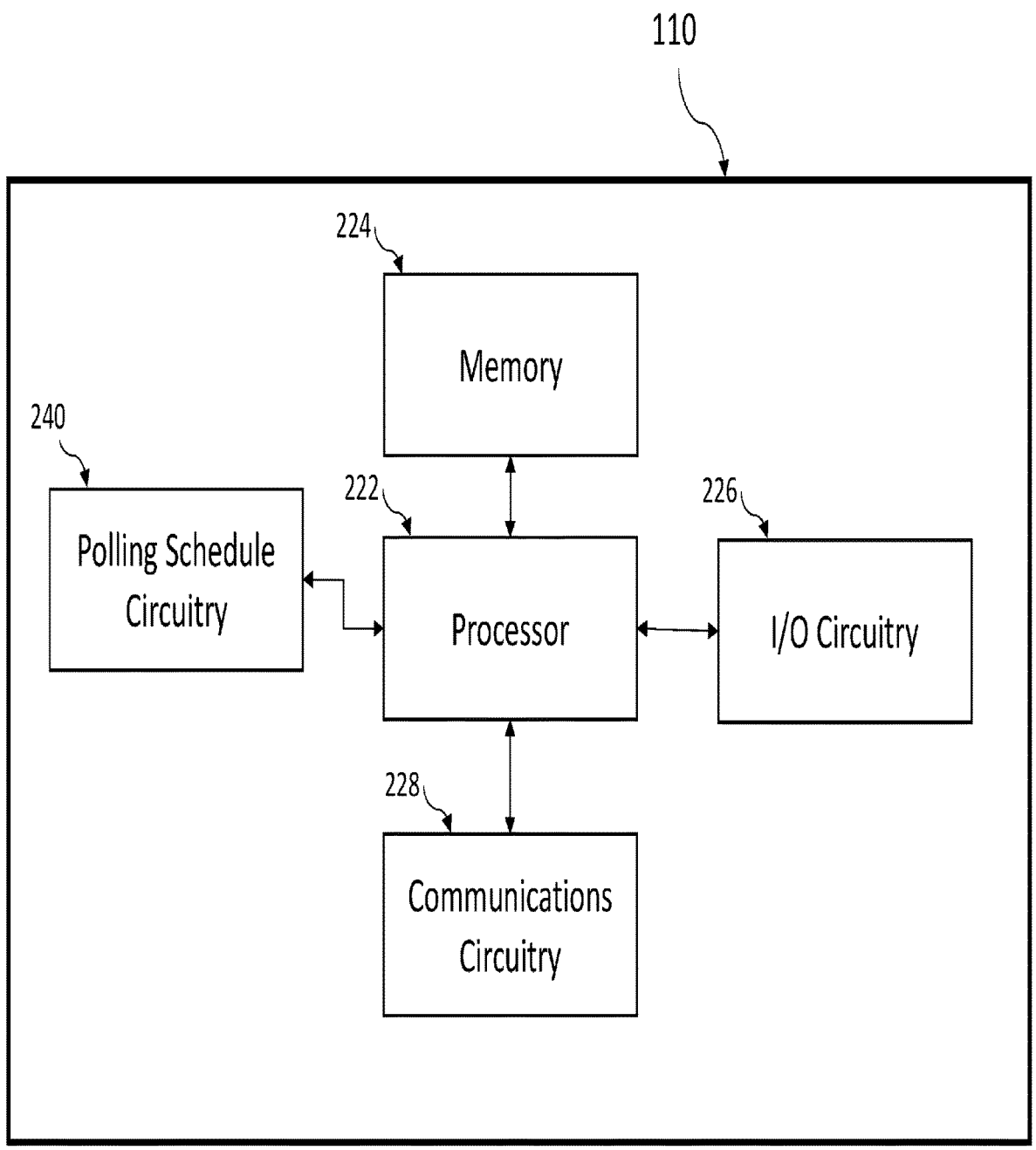
FIG. 2B shows a schematic view of an apparatus for use with embodiments of the present disclosure.

A polling schedule server 110 may be embodied by one or more computing systems, such as apparatus 220 shown in FIG. 2B. The apparatus 220 may include processor 222, memory 224, input/output circuitry 226, communications circuitry 228, and polling schedule circuitry 240. The apparatus 220 may be configured to execute the operations described herein. Although these components 222-240 are described with respect to functional limitations, it should be understood that the particular implementations necessarily include the use of particular hardware. It should also be understood that certain of these components 222-240 may include similar or common hardware. For example, two sets of circuitries may both leverage use of the same processor, network interface, storage medium, or the like to perform their associated functions, such that duplicate hardware is not required for each set of circuitries.

In some embodiments, the processor 222 (and/or co-processor or any other processing circuitry assisting or otherwise associated with the processor) may be in communication with the memory 224 via a bus for passing information among components of the apparatus. The memory 224 is non-transitory and may include, for example, one or more volatile and/or non-volatile memories. In other words, for example, the memory 224 may be an electronic storage device (e.g., a computer-readable storage medium). The memory 224 may be configured to store information, data, content, applications, instructions, or the like for enabling the apparatus to carry out various functions in accordance with example embodiments of the present invention.

The processor 222 may be embodied in a number of different ways and may, for example, include one or more processing devices configured to perform independently. In some preferred and non-limiting embodiments, the processor 222 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 222 may be configured to execute instructions stored in the memory 224 or otherwise accessible to the processor 222. In some preferred and non-limiting embodiments, the processor 222 may be configured to execute hard-coded functionalities. As such, whether configured by hardware or software methods, or by a combination thereof, the processor 222 may represent an entity (e.g., physically embodied in circuitry) capable of performing operations according to an embodiment of the present invention while configured accordingly. Alternatively, as another example, when the processor 222 is embodied as an executor of software instructions, the instructions may specifically configure the processor 222 to perform the algorithms and/or operations described herein when the instructions are executed.

In some embodiments, the apparatus 220 may include input/output circuitry 226 that may, in turn, be in communication with processor 222 to provide output to the/a user and, in some embodiments, to receive an indication of a user input. The input/output circuitry 226 may comprise a user interface and may include a display, and may comprise a web user interface, a mobile application, a client device, a kiosk, or the like. In some embodiments, the input/output circuitry 226 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 224, and/or the like).

The communications circuitry 228 may be any means such as a device or circuitry embodied in either hardware or a combination of hardware and software that is configured to receive and/or transmit data from/to a network and/or any other device, circuitry, or module in communication with the apparatus 220. In this regard, the communications circuitry 228 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communications circuitry 228 may include the circuitry for interacting with the antenna/antennae to cause transmission of signals via the antenna/antennae or to handle receipt of signals received via the antenna/antennae.

Polling schedule circuitry 240 includes hardware configured to manage client-initiated polling requests received from one or more client devices 101A-101N intended for one or more communication servers 106. The polling schedule circuitry 240 may utilize processing circuitry, such as the processor 222, to perform these actions. However, it should also be appreciated that, in some embodiments, the polling schedule circuitry 240 may include a separate processor, specially configured Field Programmable Gate Array (FPGA), or Application Specific Integrated Circuit (ASIC) for performing the functions described herein. The polling schedule circuitry 240 may be implemented using hardware components of the apparatus configured by either hardware or software for implementing these planned functions.

It is also noted that all or some of the information discussed herein can be based on data that is received, generated and/or maintained by one or more components of apparatus 220. In some embodiments, one or more external systems (such as a remote cloud computing and/or data storage system) may also be leveraged to provide at least some of the functionality discussed herein.

Figure 2C:
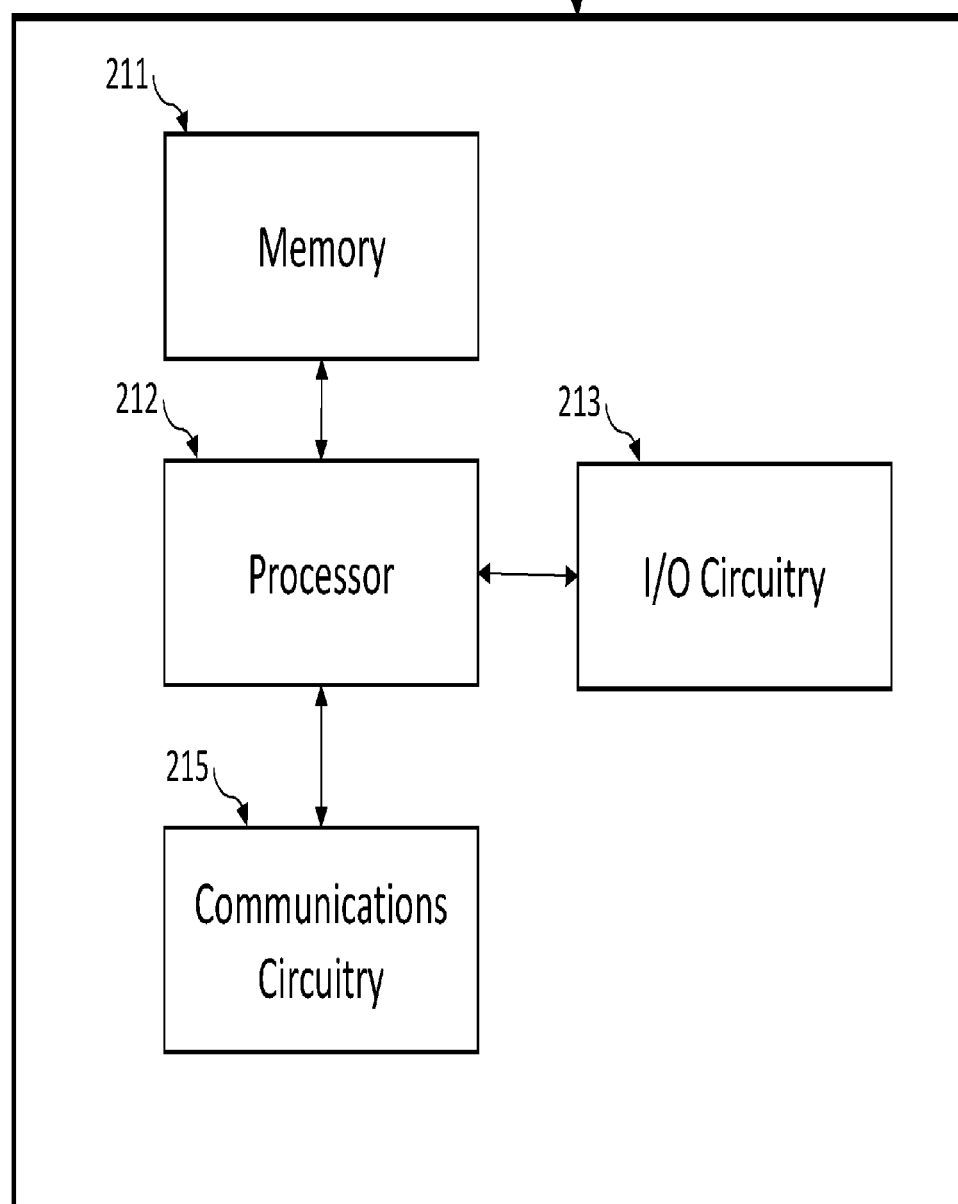
FIG. 2C shows a schematic view of a client device for use with embodiments of the present disclosure.

In the illustrated embodiment of FIG. 2C, a client device 101 is embodied by one or more computing systems encompassing apparatus 230. The illustrated apparatus 230 includes processor 212, memory 211, input/output circuitry 213, and communications circuitry 215. The apparatus 230 may be configured to execute the operations described herein. Although these components 211, 212, 213, 215 are described with respect to functional limitations, it should be understood that the particular implementations necessarily include the use of particular hardware. It should also be understood that certain of these components 211, 212, 213, 215 may include similar or common hardware. For example, two sets of circuitries may both leverage use of the same processor, network interface, storage medium, or the like to perform their associated functions, such that duplicate hardware is not required for each set of circuitries.

In some embodiments, the processor 212 (and/or co-processor or any other processing circuitry assisting or otherwise associated with the processor) may be in communication with the memory 211 via a bus for passing information among components of the apparatus. The memory 211 is non-transitory and may include, for example, one or more volatile and/or non-volatile memories. In other words, for example, the memory 211 may be an electronic storage device (e.g., a computer-readable storage medium). The memory 211 may be configured to store information, data, content, applications, instructions, or the like for enabling the apparatus 230 to carry out various functions in accordance with example embodiments of the present invention. For example, the memory 211 may be configured to cache messages exchanged on one or more group-based communication channels, such that the processor 212 may provide various messages to client devices (e.g., on an as needed or as requested basis).

The processor 212 may be embodied in a number of different ways and may, for example, include one or more processing devices configured to perform independently. In some preferred and non-limiting embodiments, the processor 212 may include one or more processors configured in tandem via a bus to enable independent execution of instructions, pipelining, and/or multithreading.

In some preferred and non-limiting embodiments, the processor 212 may be configured to execute instructions stored in the memory 211 or otherwise accessible to the processor 212. In some preferred and non-limiting embodiments, the processor 212 may be configured to execute hard-coded functionalities. As such, whether configured by hardware or software methods, or by a combination thereof, the processor 212 may represent an entity (e.g., physically embodied in circuitry) capable of performing operations according to an embodiment of the present invention while configured accordingly. Alternatively, as another example, when the processor 212 is embodied as an executor of software instructions, the instructions may specifically configure the processor 212 to perform the algorithms and/or operations described herein when the instructions are executed.

In some embodiments, the apparatus 230 may include input/output circuitry 305 that may, in turn, be in communication with processor 212 to provide output to the user and, in some embodiments, to receive an indication of a user input. The input/output circuitry 213 may comprise a user interface and may include a display, and may comprise a web user interface, a mobile application, a client device, a kiosk, or the like. In some embodiments, the input/output circuitry 213 may also include a keyboard, a mouse, a joystick, a touch screen, touch areas, soft keys, a microphone, a speaker, or other input/output mechanisms.

The communications circuitry 215 may be any means such as a device or circuitry embodied in either hardware or a combination of hardware and software that is configured to receive and/or transmit data from/to a network and/or any other device, circuitry, or module in communication with the apparatus 230. In this regard, the communications circuitry 215 may include, for example, a network interface for enabling communications with a wired or wireless communication network. For example, the communications circuitry 215 may include one or more network interface cards, antennae, buses, switches, routers, modems, and supporting hardware and/or software, or any other device suitable for enabling communications via a network. Additionally or alternatively, the communications circuitry 215 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 230. In some embodiments, one or more external systems (such as a remote cloud computing and/or data storage system) may also be leveraged to provide at least some of the functionality discussed herein.

The term "circuitry" should be understood broadly to include hardware and, in some embodiments, software for configuring the hardware. With respect to components of each apparatus 200, 220, 230, the term "circuitry" as used herein should therefore be understood to include particular hardware configured to perform the functions associated with the particular circuitry as described herein. For example, in some embodiments, "circuitry" may include processing circuitry, storage media, network interfaces, input/output devices, and the like. In some embodiments, other elements of the apparatus 200 may provide or supplement the functionality of particular circuitry.

As will be appreciated, any such computer program instructions and/or other type of code may be loaded onto a computer, processor or other programmable apparatus's circuitry to produce a machine, such that the computer, processor or other programmable circuitry that execute the code on the machine creates the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Moreover, although not shown, various embodiments of a group-based communication platform may comprise one or more databases configured for storing and/or indexing messages exchanged within various group-based communication channels.

Example Data Flows

It will be appreciated that, while the depictions in the following figures include a request/grant occurring between a single client device and the polling schedule server, the present disclosure relates to embodiments wherein the polling schedule server is simultaneously receiving a plurality of such requests, simultaneously (or as near simultaneous as possible) processing them, and granting them, from/to a plurality of disparate client devices in multiple geographic locations.

Figure 3A:
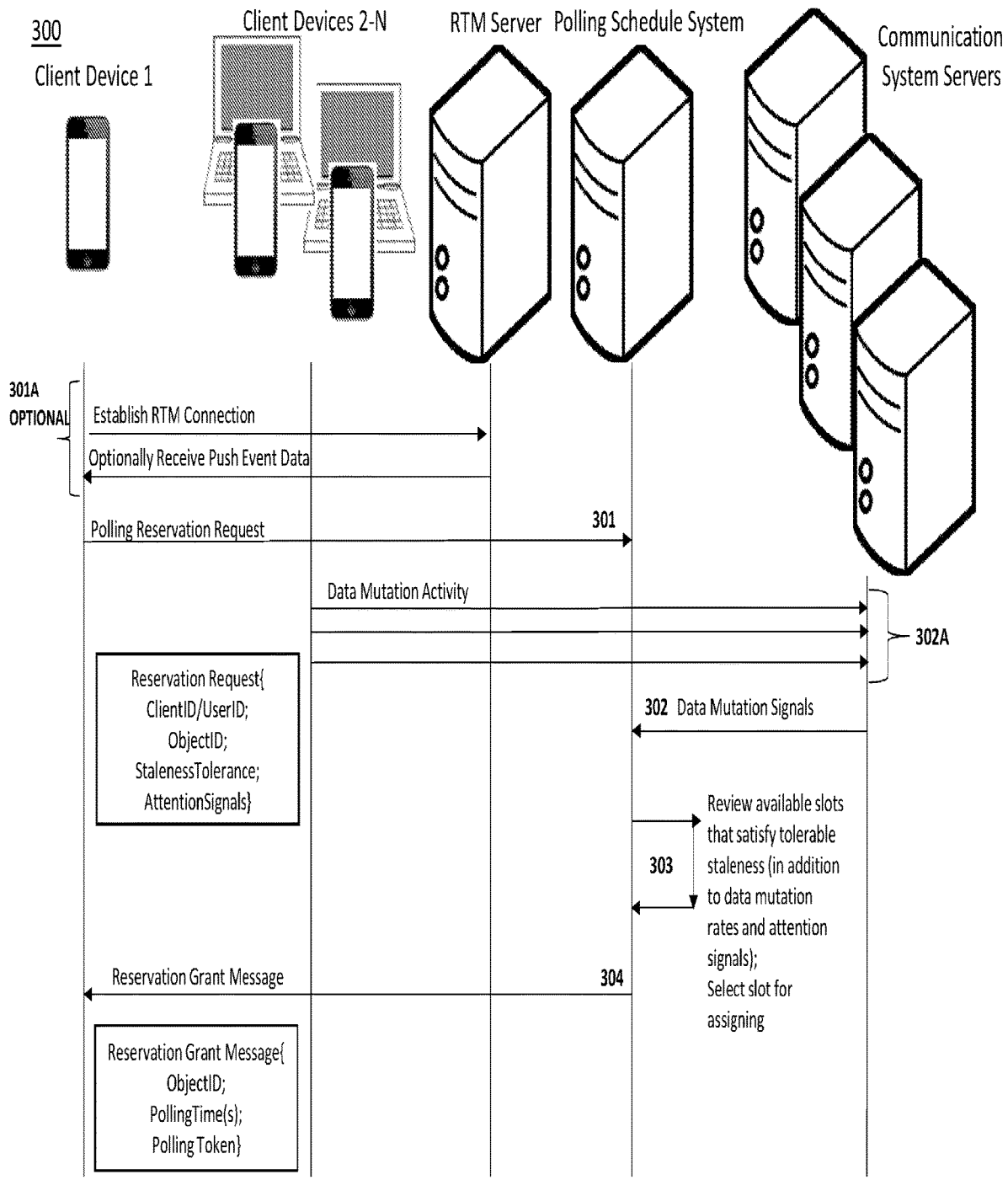
FIG. 3A shows a schematic view of data transmissions between a client device and a communication platform or system, according to embodiments of the present disclosure.
Figure 3B:
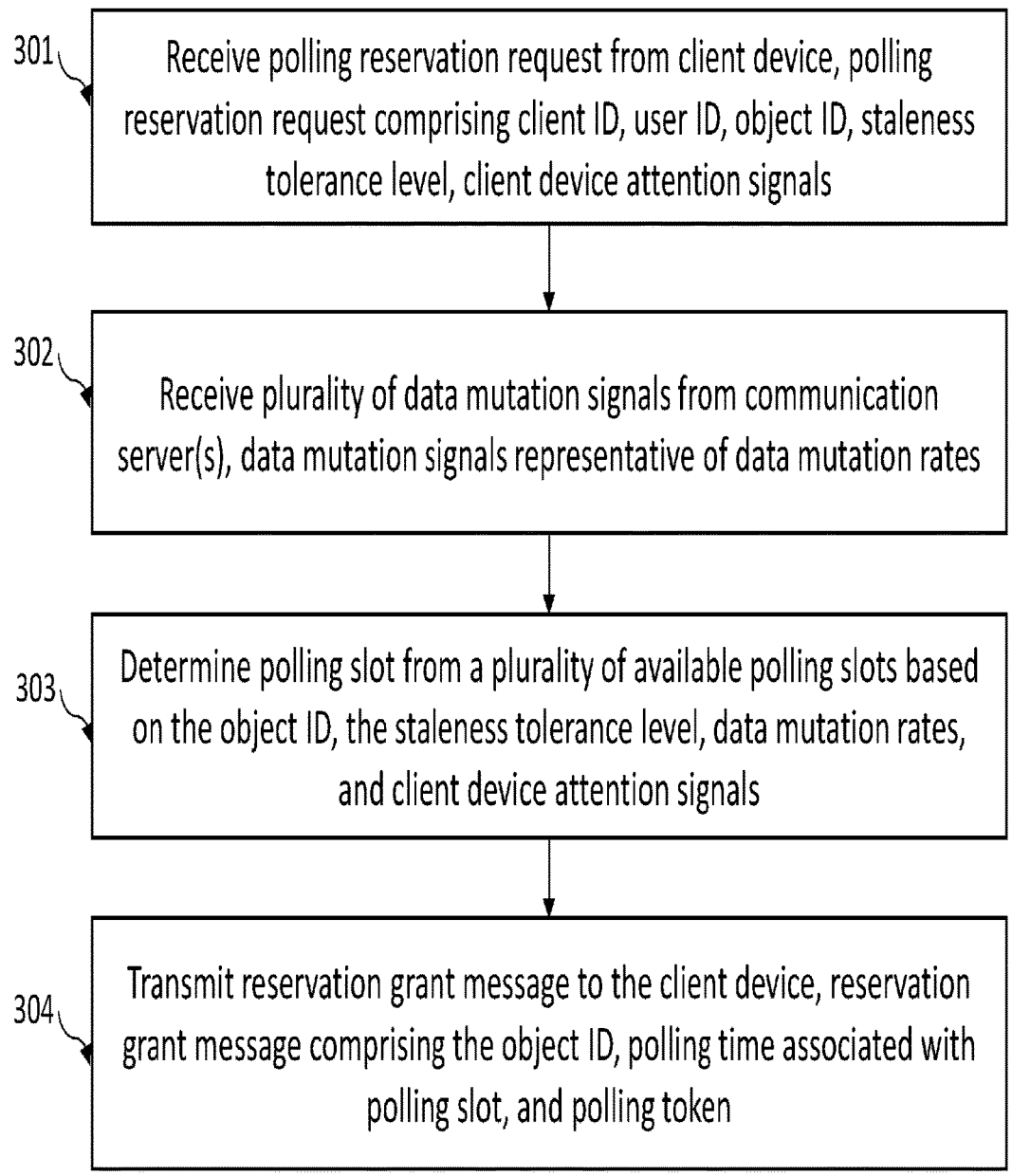
FIG. 3B is a flowchart illustrating the data transmissions between the client device and a communication platform or system, according to embodiments of the present disclosure.

FIGS. 3A-3B show exemplary data transmissions between a client device and a communication platform or system, according to embodiments of the present disclosure. The communication platform may be, in some embodiments, a group-based communication platform.

In embodiments, an apparatus for managing client initiated polling requests in a communication system comprises at least one processor and at least one non-transitory storage medium for storing instructions that, when executed by the at least one processor, cause the apparatus to perform various operations as described herein.

In embodiments, at operation 301, a polling reservation request is received from a client device accessing the communication system. In embodiments, the polling reservation request comprises a client device identifier, a user identifier, an object identifier, a staleness tolerance level, and a plurality of client device attention signals. In embodiments, the polling reservation request is received by a polling schedule server or system. It will be appreciated that a plurality of client devices may be accessing the communication system simultaneously (as opposed to the example depicting a single client device accessing the communication system), in which case a plurality of polling reservation requests are received simultaneously. In such scenarios, respective polling slots are granted to each client device of the plurality of client devices according to the description below.

In embodiments, at operation 302, a plurality of communication system data mutation signals are received from one or more communication servers. In embodiments, each communication system data mutation signal is associated with a data mutation rate and a communication system object identifier.

In embodiments, at operation 303, a first polling slot is determined from a plurality of available polling slots. In embodiments, the determining is based on the object identifier, the staleness tolerance level, the data mutation rates, and the plurality of client device attention signals. Non-limiting examples of how a polling slot is determined may be understood below.

In embodiments, at operation 304, a reservation grant message is transmitted to the client device. In embodiments, the reservation grant message comprises the object identifier, a first polling time associated with the first polling slot, and a first polling token. In embodiments, the reservation grant message comprises a plurality of polling slots, each associated with a unique polling time, and the first polling token.

Figure 4A:
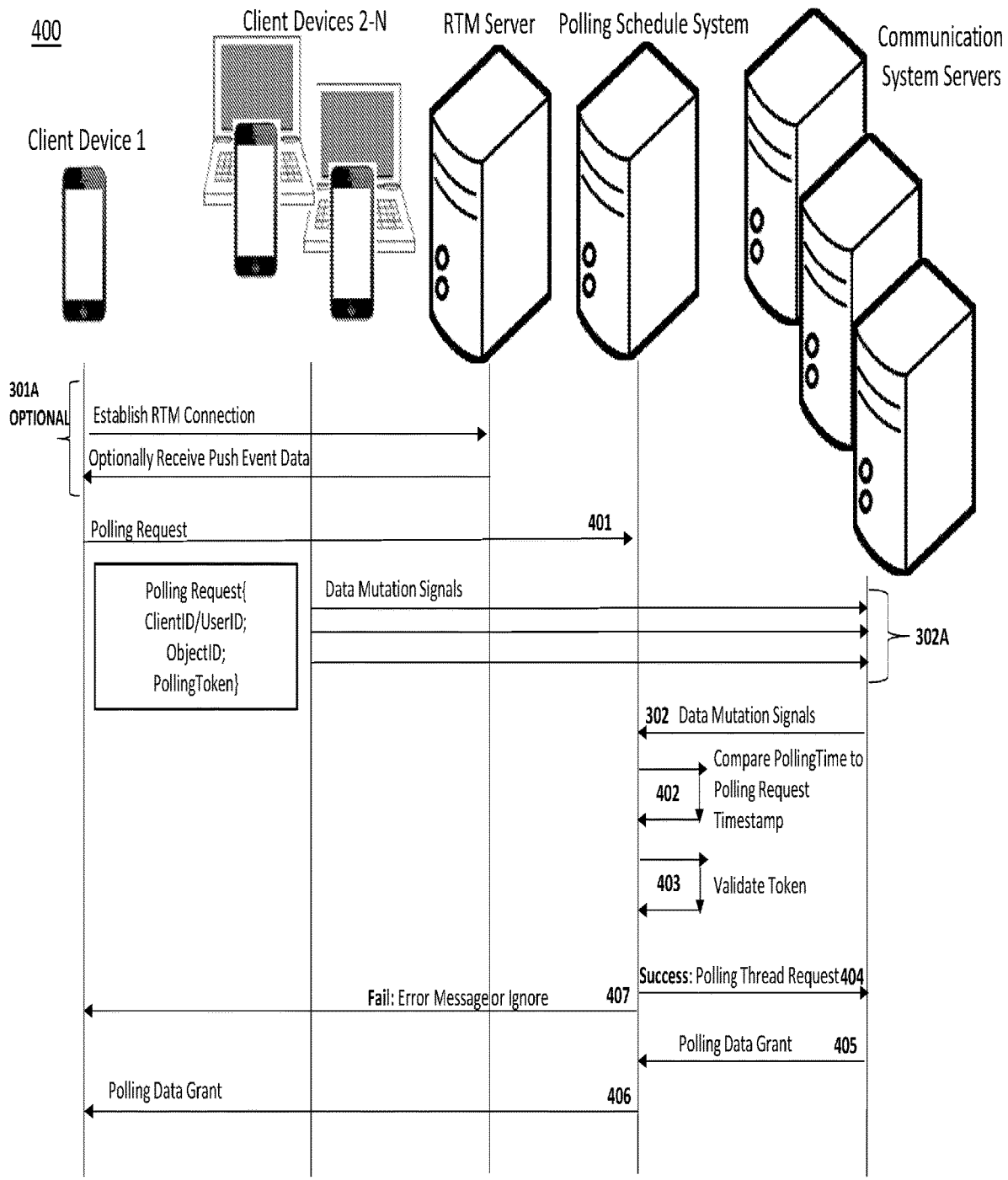
FIG. 4A shows a schematic view of data transmissions between a client device and a communication platform or system, according to embodiments of the present disclosure.
Figure 4B:
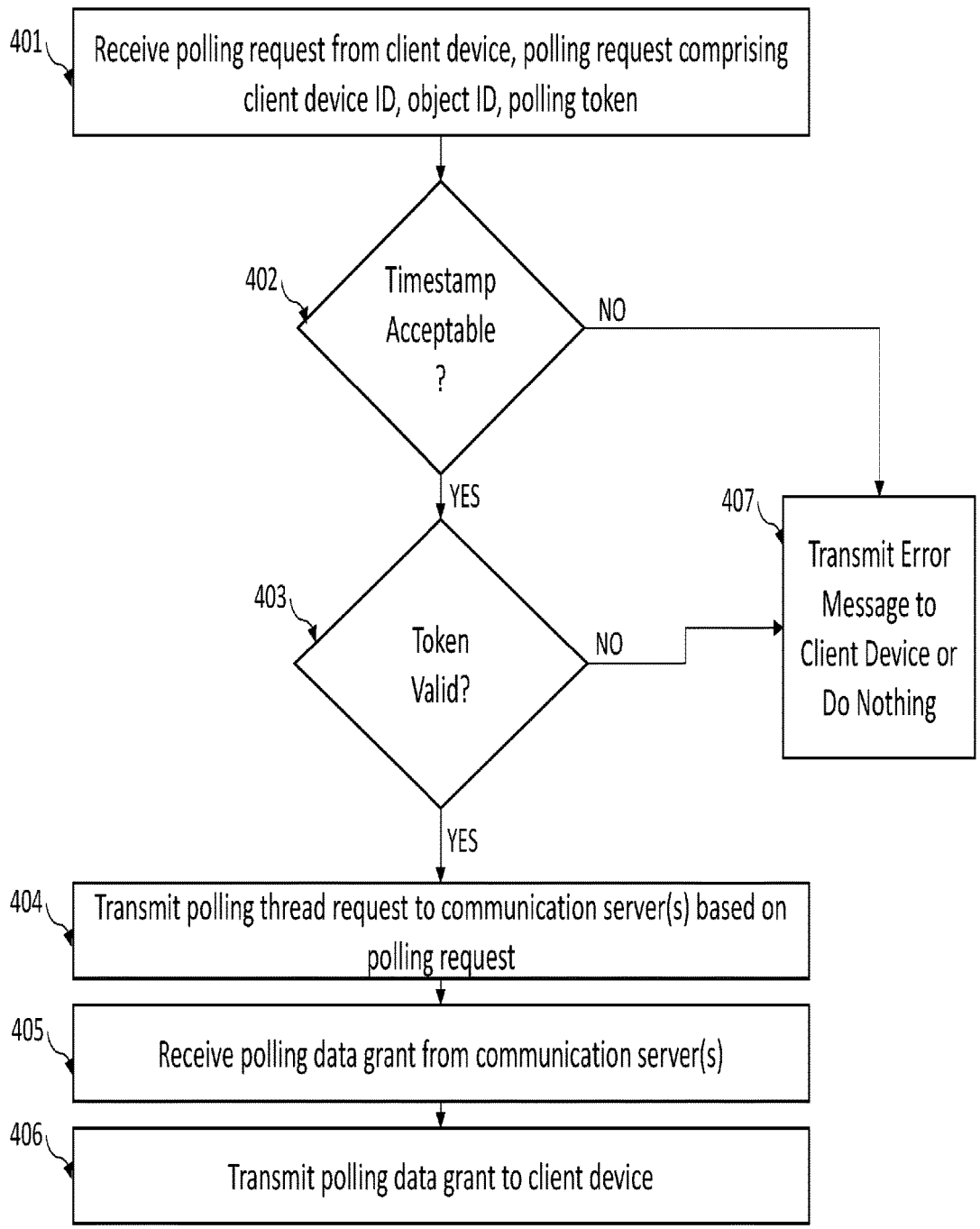
FIG. 4B is a flowchart illustrating the data transmissions between the client device and a communication platform or system, according to embodiments of the present disclosure.

FIGS. 4A and 4B illustrate exemplary data transmissions between a client device and a communication platform or system, according to embodiments of the present disclosure.

In embodiments, an apparatus for managing client initiated polling requests in a communication system comprises at least one processor and at least one non-transitory storage medium for storing instructions that, when executed by the at least one processor, cause the apparatus to perform various operations as described herein.

In embodiments, at operation 401, a first polling request is received from a client device. In embodiments, the first polling request comprises the client device identifier, the object identifier, and the first polling token. In embodiments, the first polling request is associated with a first polling request timestamp.

In embodiments, at operation 402, the first polling request timestamp is compared with the first polling time associated with the first polling slot.

In embodiments, at operation 403, upon determining that a difference between the first polling request timestamp and the first polling time meets an acceptable time gap threshold, the polling token is validated.

In embodiments, at operation 404, upon determining that the polling token is valid, a polling thread request is transmitted to one or more group-based communication servers based on the first polling request. It will be appreciated that steps 402 and 403 may comprise a single validation/comparison step, in embodiments.

In embodiments, at operation 405, a polling data grant is received from the one or more communication servers.

In embodiments, at operation 406, the polling data grant is transmitted to the client device.

In embodiments, at operation 407, an error message is optionally transmitted to the client device if one or both of operations 402 or 403 are unsuccessful (i.e., the token is not valid, the polling time is outside the acceptable time gap threshold). In embodiments, at operation 407, the polling schedule server does nothing if one or both of operations 402 or 403 are unsuccessful (i.e., the token is not valid, the polling time is outside the acceptable time gap threshold). In other words, the polling request is ignored.

In embodiments, a second polling request is received from the client device. In embodiments, the second polling request comprises the client device identifier, the object identifier, and the first polling token, the polling request associated with a timestamp. The first polling token is validated. In embodiments, a second polling slot is determined from a plurality of available polling slots based on a plurality of updated data mutation rates received from one or more communication servers. A second reservation grant message is then transmitted to the client device, the second reservation grant message comprising the object identifier, a second polling time associated with the second polling slot, and a second polling token. In embodiments, the second polling request comprises updated client attention signals.

In embodiments, the staleness tolerance level represents a level of importance of fresh data to the client device. In embodiments, a client device attention signal represents electronic interactions on a client device with a communication system interface or other interfaces on the client device.

In embodiments, a client device attention signal is one or more of: (1) is the communication system interface focused on the client device, and if not, how long has it been since it was focused; (2) is the communication system interface displayed on the client device, and if not, how long has it been since it was displayed; (3) how long has it been since the user interacted with the communication system interface in some way; (4) how long has it been since the user interacted with the client device in some way; (5) is a screensaver interface displayed on the client device; and (6) has the user recently received a push notification on the client device.

In embodiments, the data mutation signal is representative of electronic interaction activity associated with a communication system object identifier. In embodiments, the data mutation rate is determined based on a number of data mutation signals associated with a communication system object identifier received over a particular amount of network time.

In embodiments, the polling slot comprises a duration of network time during which a polling request will be granted for a particular device from which the polling request was received.

In embodiments, the object identifier comprises a group-based communication channel identifier.

In embodiments, the acceptable time gap threshold is a maximum duration of network time that can exist between the polling request timestamp and the polling time.

In embodiments, the polling request is a transmission of a request message to a web Application Programming Interface (API). In embodiments, the polling request message is a Hypertext Transfer Protocol (HTTP) request.

In embodiments, the reservation grant message comprises a plurality of polling times.

In embodiments, the communication system comprises a group-based communication system. In embodiments, the one or more communication servers comprise group-based communication servers.

In embodiments, a polling schedule server (or set of polling schedule servers) may employ various methodologies when dynamically determining polling slots for a plurality of client devices simultaneously or seemingly simultaneously (or even closely in sequence) attempting to access one or more communication servers. In some embodiments, the polling schedule server may operate under an assumption that all polling operations (e.g., thread execution requests) will take the same amount of time (i.e., resulting in an ability to divide future network time evenly into segments). In such embodiments, the polling scheduler server must ensure enough execution threads are available for a given segment of future network time for any particular set of object data updates. In other embodiments, the polling schedule server may estimate an amount of time required for a thread execution request or polling request, evaluate back end capacity, and assign polling slots accordingly. In other embodiments, the polling scheduler server may randomly queue polling requests.

In other embodiments, the polling scheduler server may apply a machine-learning based approach whereby multiple optimization options can be selected (e.g., balancing between a distribution of server load and a freshness of data; the balancing achieved by applying different weights according to a desired outcome).

In yet other embodiments, polling slots may be assigned in accordance with different levels of quality of service (QoS) associated with different levels of consumers and/or access levels of the communication system. For example, priority may be given to those reservation requests received from client devices associated with a particular organization identifier; priority may also be given to those reservation requests associated with object identifiers that are known to be associated with a particular organization identifier.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A method comprising:
receiving, from a client associated with a user account of a user, a polling reservation request comprising at least one of a client identifier or a user identifier associated with the user account;
determining, based at least in part on the at least one of the client identifier or the user identifier, interaction data associated with the user accessing a remote platform via the client;
determining a level of interaction associated with one or more other users interacting with the remote platform;
determining, based at least in part on the interaction data and the level of interaction, a first polling slot associated with the client receiving updated data associated with the remote platform; and
transmitting, to the client, a reservation grant message comprising a first polling time associated with the first polling slot and a first polling token.

2. The method of claim 1, further comprising:
receiving, from the client associated with the user account, a polling request comprising the at least one of the client identifier or the user identifier and the first polling token;
validating the polling request based at least in part on at least one of:
determining that a time associated with the polling request is within a threshold time of the first polling time; or
determining that the first polling token if valid; and
transmitting, to the client, the updated data associated with the remote platform.

3. The method of claim 2, further comprising:
identifying a communication channel identifier associated with a communication channel of the remote platform that is included in the polling reservation request; and
identifying the updated data based at least in part on the communication channel identifier.

4. The method of claim 2, wherein the polling request is received at a first time, the method further comprising:
identifying a second time associated with a previous data transmission associated with a previous polling request, wherein the second time is prior to the first time,
wherein the updated data transmitted to the client comprises data that is associated with the remote platform after the second time and before the first time.

5. The method of claim 1, further comprising:
receiving, from the client associated with the user account, a polling request comprising the at least one of the client identifier or the user identifier and the first polling token;

determining that a time associated with the polling request is greater than a threshold time from the first polling time; and withholding data from the client based at least in part on the time being greater than the threshold time from the first polling time.

6. The method of claim 5, further comprising transmitting, to the client, an error message associated with the polling request.

7. The method of claim 1, further comprising:

determining, based at least in part on the at least one of the client identifier or the user identifier, a time period for updating data associated with the client, wherein the first polling slot is determined based at least in part on the time period for updating data.

8. The method of claim 1, further comprising:

identifying one or more available polling slots associated with the remote platform providing data to a requesting client; and selecting, based at least in part on one or more factors, an available polling slot from the one or more available polling slots, wherein the first polling slot comprises the available polling slot.

9. The method of claim 8, wherein the one or more factors comprise at least one of:

a data update interval associated with the at least one of the client identifier or the user identifier;

a first level of interaction associated with a communication channel over a first period of time, the communication channel being associated with the polling reservation request;

a second level of interaction associated with a group of users interacting with the remote platform over a second period of time; or a recency of interaction of the user with the remote platform.

10. A system associated with a communication platform, wherein the system comprises:

one or more processors; and one or more computer-readable media comprising instructions that, when executed by the one or more processors, cause the system to perform operations comprising:

receiving, from a client associated with a user account of a user, a polling reservation request comprising at least one of a client identifier or a user identifier associated with the user account;

determining, based at least in part on the at least one of the client identifier or the user identifier, interaction data associated with the user accessing a remote platform via the client;

determining a level of interaction associated with one or more other users interacting with the remote platform;

determining, based at least in part on the interaction data and the level of interaction, a first polling slot associated with the client receiving updated data associated with the remote platform; and transmitting, to the client, a reservation grant message comprising a first polling time associated with the first polling slot and a first polling token.

11. The system of claim 10, the operations further comprising:

receiving, from the client associated with the user account, a polling request comprising the at least one of the client identifier or the user identifier and the first polling token;

validating the polling request based at least in part on at least one of:

determining that a time associated with the polling request is within a threshold time of the first polling time; or determining that the first polling token if valid; and transmitting, to the client, the updated data associated with the remote platform.

12. The system of claim 11, the operations further comprising:

identifying a communication channel identifier associated with a communication channel of the remote platform that is included in the polling reservation request; and identifying the updated data based at least in part on the communication channel identifier.

13. The system of claim 11, wherein the polling request is received at a first time, the operations further comprising:

identifying a second time associated with a previous data transmission associated with a previous polling request, wherein the second time is prior to the first time, wherein the updated data transmitted to the client comprises data that is associated with the remote platform after the second time and before the first time.

14. The system of claim 10, the operations further comprising:

receiving, from the client associated with the user account, a polling request comprising the at least one of the client identifier or the user identifier and the first polling token;

determining that a time associated with the polling request is greater than a threshold time from the first polling time; and withholding data from the client based at least in part on the time being greater than the threshold time from the first polling time.

15. The system of claim 10, the operations further comprising:

determining, based at least in part on the at least one of the client identifier or the user identifier, a time period for updating data associated with the client, wherein the first polling slot is determined based at least in part on the time period for updating data.

16. The system of claim 10, the operations further comprising:

identifying one or more available polling slots associated with the remote platform providing data to a requesting client; and selecting, based at least in part on one or more factors, an available polling slot from the one or more available polling slots, wherein the first polling slot comprises the available polling slot.

17. One or more non-transitory computer-readable media comprising instructions that, when executed by one or more processors, cause the one or more processors to perform operations comprising:

receiving, from a client associated with a user account of a user, a polling reservation request comprising at least one of a client identifier or a user identifier associated with the user account;

determining, based at least in part on the at least one of the client identifier or the user identifier, interaction data associated with the user accessing a remote platform via the client;

determining a level of interaction associated with one or more other users interacting with the remote platform;

determining, based at least in part on the interaction data and the level of interaction, a first polling slot associated with the client receiving updated data associated with the remote platform; and transmitting, to the client, a reservation grant message comprising a first polling time associated with the first polling slot and a first polling token.

18. The one or more non-transitory computer-readable media of claim 17, the operations further comprising:

receiving, from the client associated with the user account, a polling request comprising the at least one of the client identifier or the user identifier and the first polling token;

validating the polling request based at least in part on at least one of:

determining that a time associated with the polling request is within a threshold time of the first polling time; or determining that the first polling token if valid; and transmitting, to the client, the updated data associated with the remote platform.

19. The one or more non-transitory computer-readable media of claim 18, the operations further comprising:

identifying a communication channel identifier associated with a communication channel of the remote platform that is included in the polling reservation request; and identifying the updated data based at least in part on the communication channel identifier.

20. The one or more non-transitory computer-readable media of claim 18, wherein the polling request is received at a first time, the operations further comprising:

identifying a second time associated with a previous data transmission associated with a previous polling request, wherein the second time is prior to the first time, wherein the updated data transmitted to the client comprises data that is associated with the remote platform after the second time and before the first time.

* * * * *